United States Patent
Lange et al.

(10) Patent No.: US 9,469,403 B2
(45) Date of Patent: Oct. 18, 2016

(54) MONUMENT FOR AN AIRCRAFT COMPRISING A LIFT APPARATUS

(71) Applicant: Airbus Operations GmbH, Hamburg (DE)

(72) Inventors: Roland Lange, Nottensdorf (DE); Stefan Ebeling, Wilhelmshaven (DE); Jens Gärtner, Hamburg (DE); Andreas Köhler, Hamburg (DE); Raj Kotian, Hamburg (DE); Ralf Schliwa, Dollern (DE)

(73) Assignee: Airbus Operations GmbH (DE)

( * ) Notice: Subject to any disclaimer, the term of this patent is extended or adjusted under 35 U.S.C. 154(b) by 16 days.

(21) Appl. No.: 14/306,361

(22) Filed: Jun. 17, 2014

(65) Prior Publication Data

US 2014/0367518 A1    Dec. 18, 2014

(30) Foreign Application Priority Data

Jun. 17, 2013 (EP) .................................... 13172369

(51) Int. Cl.
*B64D 11/04* (2006.01)
*B64D 11/00* (2006.01)

(52) U.S. Cl.
CPC ........... *B64D 11/04* (2013.01); *B64D 11/0007* (2013.01); *Y02T 50/46* (2013.01)

(58) Field of Classification Search
USPC ........................................... 244/118.1, 118.5
See application file for complete search history.

(56) References Cited

U.S. PATENT DOCUMENTS

| | | | | | |
|---|---|---|---|---|---|
| 3,517,899 | A | * | 6/1970 | Vernon | A47B 77/02 105/327 |
| 5,655,734 | A | * | 8/1997 | Dahl | B60B 33/0002 244/118.1 |
| 6,305,643 | B1 | * | 10/2001 | Sankrithi | B64D 11/0007 244/118.1 |
| 6,454,208 | B1 | * | 9/2002 | Nervig | B64D 9/003 244/118.1 |
| 6,663,043 | B1 | * | 12/2003 | Luria | B64D 9/00 244/118.1 |
| 2005/0133308 | A1 | * | 6/2005 | Reysa | B64D 11/04 186/40 |
| 2006/0186268 | A1 | * | 8/2006 | Harrington | B64D 11/0007 244/118.5 |

FOREIGN PATENT DOCUMENTS

| | | | |
|---|---|---|---|
| DE | 102 04 892 A1 | 8/2003 | |
| DE | 10204892 | * 8/2003 | ............. B64D 11/04 |
| EP | 1 642 827 A2 | 4/2006 | |

OTHER PUBLICATIONS

EP 13 17 2369 search report (Dec. 11, 2013).

\* cited by examiner

*Primary Examiner* — Justin Benedik
(74) *Attorney, Agent, or Firm* — Lerner, David, Littenberg, Krumholz & Mentlik, LLP (57) ABSTRACT

An aircraft monument includes an elongate cavity having an open end and a lift apparatus mounted to the monument and adapted for lifting goods along the longitudinal axis of the cavity. The monument is adapted to be mounted on a floor structure of an aircraft separating two compartments of the aircraft from each other such that the open end of the cavity faces the floor structure. The lift apparatus includes a guide means including two straight guide members spaced apart, and extending parallel to the longitudinal axis of the cavity, a conveying means including two conveying members each mounted to a different guide member, a moving means for linearly moving the two conveying members, a control means for controlling the moving means to synchronize the linear movement of the conveying members, and a gripping means secured to the conveying means and adapted for selectively gripping and releasing goods.

15 Claims, 4 Drawing Sheets

MONUMENT FOR AN AIRCRAFT COMPRISING A LIFT APPARATUS

FIELD OF THE INVENTION

The present application relates to a monument for an aircraft, the monument comprising a straight elongate cavity open at one of its longitudinal ends towards the exterior of the monument and a lift apparatus mounted to the monument and adapted for lifting goods from outside the monument along the longitudinal axis of the cavity through its open end into the cavity.

BACKGROUND OF THE INVENTION

Aircrafts typically comprise several distinct compartments separated from each other by wall structures. In particular, such compartments generally comprise compartments arranged one above the other and separated by a floor structure, for example a passenger compartment arranged above a cargo compartment or cargo bay. In this connection it may be desirable to utilize, process or handle objects in a monument mounted in the upper compartment, but to store these objects in the lower compartment prior to their use, processing or handling in order to maximize the space available in the upper compartment.

In the case of the upper compartment being a passenger compartment storing such objects in the lower compartment provides the advantage of maximizing the space available for seating passengers, thereby increasing profitability and flexibility in selecting an optimum cabin arrangement. Further, in the case of the lower compartment being a cargo compartment the advantage is provided that loading the objects into the aircraft is facilitated and may be carried out in accordance with standard cargo loading procedures.

One particular example for this situation is a monument which is an aircraft galley. Such galley is mounted on a floor structure in the passenger compartment of an aircraft, and the catering goods, such as food and beverages, are often loaded in boxes and/or trolleys into the aircraft and stored in a storage rack arrangement in the galley or in a separate storage rack arrangement located within the passenger compartment. Thus, in this case considerable passenger compartment space is wasted by a storage rack arrangement. It has, therefore, been suggested to dispense with the storage rack arrangement in the passenger compartment, and to utilize instead a storage rack arrangement located in the cargo compartment below the passenger compartment. In particular, such storage rack arrangement may be provided in a removable cargo container, which can be loaded into the cargo compartment together with other conventional cargo containers. Thus, boxes and trolleys with catering goods can advantageously be stored into the storage rack arrangement outside the aircraft.

In any case, it is necessary to provide for a mechanism for vertically lifting objects to be utilized, processed or handled in or by the monument mounted in the upper compartment from the lower compartment, i.e. in a direction perpendicularly or transversely to the floor structure. For this purpose, an aperture or opening is provided in a portion of the floor structure below the monument. A manual or automatic means must be provided for placing objects to be lifted at a defined location in the lower compartment where they can be engaged or grabbed by the lifting mechanism, or the lifting mechanism must be movable in the horizontal direction, i.e. along the extension of the floor structure. In the example of the galley and the use of a storage rack arrangement in a cargo container an opening or aperture must be provided in the upper wall portion of the container to allow for access of the lifting mechanism to the boxes and/or trolleys stored inside the container.

Such lifting mechanisms tend to take up space in the monument and to put high demands on the strength of the portions of the aircraft to which the lifting mechanism is mounted. For the latter reason existing lift systems intended for lifting loads over more than one deck of an aircraft are constructed as self-supporting systems, which are coupled to the primary and secondary structure of the aircraft and introduce stress directly into these structures. In particular, it is known to construct lift systems as crane-type lift devices having a cantilevered arm and being of great strength and weight and large dimensions. Therefore, considerable modifications to monuments were necessary when desiring to use them with a lift mechanism.

BRIEF SUMMARY OF THE INVENTION

An aspect of the present invention provides an aircraft monument of the above type comprising a lifting apparatus, wherein the space requirements of the lifting apparatus and the demands placed by the lifting mechanism on the monument construction are as low as possible.

According to an embodiment of the present invention a monument for an aircraft comprises a straight elongate cavity which is open at one of its two opposing longitudinal ends towards the exterior of the monument. In other words, the monument comprises an aperture coinciding with one of the two longitudinal ends of the elongate cavity. Further, the monument comprises a lift apparatus mounted to the monument and adapted for lifting objects, such as goods or boxes or trolleys including goods or other objects, e.g. catering goods, from outside the monument along the longitudinal axis of the cavity through its open end into the cavity.

The monument is adapted to be mounted on a floor structure of an aircraft separating two compartments of the aircraft from each other, i.e. the two compartments are arranged above each other with the floor structure between them. In particular, the monument is adapted to be mounted on the floor structure in such a manner that the longitudinal axis is oriented perpendicularly to the floor structure and the open end of the cavity is facing the floor structure. If an aperture is present in the floor structure below the monument in alignment with the open end of the cavity, it is therefore possible to utilize the lift apparatus to vertically lift objects from the lower compartment through the aperture of the floor structure and the open end of the cavity into the cavity, i.e. into the monument.

The lift apparatus comprises a guide means extending parallel to the longitudinal axis of the cavity, and a conveying means disposed in the cavity and mounted to the guide means such that it is linearly moveable along the guide means. In this regard, the guide means guides the conveying means in its linear movement and prevents movement transversely with respect to the guide means. The lift apparatus further comprises a moving means adapted for driving the conveying means to linearly move along the guide means. The moving means may be or comprise at least one motor, such as, in particular, an electric motor, but may alternatively or additionally also be or comprise other means, such as pneumatic or hydraulic means.

For controlling the operation of the moving means and, thus, the linear movement of the conveying means and the position of the conveying means along the guide means the lift apparatus comprises a control means adapted for effecting the control. For this purpose, it is operatively coupled with the moving means by, e.g., a wired or wireless connection.

Moreover, the lift apparatus comprises a gripping or holding means disposed in the cavity. It is secured to the conveying means and adapted for selectively gripping objects to be lifted by the lift apparatus and releasing them once they have been lifted to their destination position along the guide means.

The guide means comprises two straight guide members, such as, e.g., rails, tracks, sleeves, cables, plates, masts, grooves, rods, bars or other suitable guiding devices. The two guide members, which are preferably of identical construction, are spaced from each other, and each extends parallel to the longitudinal axis of the cavity and is attached to or provided in a different one of two spaced opposing wall portions of a sidewall arrangement defining the cavity. As commonly used the term sidewall arrangement is used to refer to wall sections bounding the cavity in a direction perpendicular to the longitudinal axis of the cavity. Thus, the sidewall arrangement extends parallel to the longitudinal axis of the cavity. It may comprise one or more sidewalls or sidewall sections, such as a single cylindrical sidewall or four sidewalls abutting each other at right angles, and, apart from possible openings or apertures, preferably completely surrounds the longitudinal axis of the cavity.

Corresponding to the two guide members the conveying means comprises two conveying members, each mounted to a different one of the guide members such that they are linearly moveable in a guided manner along the respective guide member. Accordingly, the moving means is adapted for driving each of the two conveying members to linearly move along the corresponding one of the guide members. The two conveying members are preferably of identical construction.

The control means is adapted for controlling the moving means to synchronize the linear movement of the conveying members effected by the moving means. Accordingly, in operation, when driven by the moving means, the two conveying members move at the same linear speed. Further, they are preferably driven to always be at the some vertical position or to at least have a fixed difference between the vertical positions. In this respect it must be noted, however, that due to possible relative motions of different portions of the aircraft during operation, such as, for example, the sidewall portions of the monument to which the guide members are attached, slightly varying differences in the vertical positions of the conveying members may be possible even if the synchronous control is effected to also synchronize the vertical positions.

Finally, the gripping means is attached or mounted to the two conveying members such that the two guide members and the two conveying members are disposed on opposite sides of the gripping means, preferably at an angular distance of 180° or about 180° with respect to the longitudinal axis of the cavity. Thus, the gripping means is supported between the two conveying members when viewed along the longitudinal axis of the cavity. Due to the attachment to the conveying members the gripping means linearly moves upon movement of the conveying members.

The provision of two separate guide members on opposite sides of the gripping means and the mounting of the gripping means to two conveying members each attached to and guided along a different one of the guide members provides the advantage that upon synchronous control of the two conveying members the load caused by the gripping means and any object held by it is evenly distributed between the two conveying members and guide members on opposite sides of the gripping means. Therefore, as compared to prior art crane-type lift devices having a cantilevered arm, the requirements for securely mounting the lift apparatus to the aircraft are greatly reduced, so that for typical applications it becomes possible to attach or integrate the lift apparatus to or into monument sidewalls of conventional construction without disadvantageously requiring an increased wall thickness. Moreover, different from the prior art crane-type lift devices, when choosing an angular distance of 180° or about 180° between the guide members and between the conveying members no momentum is introduced in the support or suspension mounts of the gripping means to the conveying members. This further reduces the requirements placed on the sidewalls of the monument. The above properties also advantageously allow for a more compact design, which permits integration into a monument with relatively small space requirements. Also, the weight of the lift apparatus and of the monument is or can be reduced, for example the weight of the guide means, the conveying means and the moving means.

In a preferred embodiment the monument is an aircraft galley. As already explained above, such galley is preferably mounted on a floor structure in the passenger compartment of an aircraft with an aperture or opening being arranged in a portion of the floor structure below the galley and aligned with the open end of the cavity. Then, as explained above, catering goods, such as in particular food and beverages, which have been loaded in e.g. boxes and/or trolleys into the aircraft and stored in a storage rack arrangement located in the cargo compartment below the passenger compartment, for example in a removable cargo container, may be advantageously lifted vertically by the lift apparatus from the cargo compartment directly into the galley in the passenger compartment.

In a preferred embodiment the lift apparatus further comprises a suspension means attached to and supported between the two conveying members, and the gripping means is secured to the suspension means in a suspended manner. In other words, the gripping means is secured to the two conveying members via the suspension means and is suspended on the suspension means. Thus, in operation when the galley is mounted on a floor structure of the aircraft in the above manner, the gripping means is located below the suspension means. This arrangement facilitates securing the gripping means to the conveying members while enabling some degree of relative rotational and/or translational movement between the conveying members and the gripping means during operation. For example, the gripping means may be mounted to the suspension means by a pivot pin connection or a spherical or ball bearing arrangement and/or the suspension means may be coupled to each of the two conveying members by a pivot pin arrangement or a spherical or ball bearing arrangement, thereby allowing for relative rotation about one, two or three perpendicular axes. Thus, it is generally preferred if the suspension means is mounted to one of the two conveying members or to each of the two conveying members by means of a respective bearing arrangement allowing for relative rotational movement about two or three perpendicular axes, e.g. a spherical bearing arrangement. Additionally or in the alternative it is generally preferred if the gripping means is mounted to the suspension means by means of an articulated joint. If the suspension means is mounted to only one of the two conveying members by means of a bearing arrangement allowing for relative rotational movement about two or three perpendicular axes, e.g., a spherical bearing arrangement, it is possible that the suspension means is mounted to the other of the two conveying members by means of a bearing arrangement allowing for rotational movement about only one axis.

In a preferred embodiment the moving means comprises two electrical synchronized motors controlled by the control means. In an alternative preferred embodiment the moving means comprises a single electrical motor and a power splitting means arranged and adapted for splitting the power provided by the single electrical motor and synchronously distributing it to the conveying members. Instead of one or two electrical motors, it is also possible to provide hydraulic or pneumatic drive means.

In a preferred embodiment, in which the monument is an aircraft galley as described above, the galley comprises a plurality of trolley compartments and a plurality of trolleys. Each of the trolleys is removably received in a respective one of the trolley compartments. Due to the construction of the lift apparatus it is advantageously possible to choose the width of the cavity to be at most 1.5 times the width of the trolley compartments. For conventional trolley compartment dimensions this is made possible by the compact construction of the lift apparatus of the present invention. In this manner the trolley storage capacity of the galley is affected to a minimum extent only.

In a preferred embodiment the moving means comprises belts or chains attached to the conveying members and operable for moving the conveying members along the guide members. The belts or chains are operated by the moving means, i.e. the moving means is coupled to the conveying members via the belts or chains. In an alternative preferred embodiment the moving means comprises two spindles, one for each conveying member, and corresponding motors for rotating the spindles. Each spindle extends parallel to another one of the guide members, and the conveying members are coupled to the spindles such that rotation of the spindles effects movement of the conveying members along the spindles. The spindles may form part of the guide members.

In a preferred embodiment the monument further comprises a door and a door opening provided in the sidewall arrangement. The cavity is accessible through the door opening, and the door is adapted for selectively opening and closing the door opening. The door, which may preferably be a sliding door, is preferably constructed as a safety door which is adapted such that it only opens automatically or can only be opened automatically or manually if an object lifted by the lift apparatus is positioned behind the door. This requires, of course, that the lift apparatus is arranged in such a manner with respect to the door opening that the gripping unit is able to lift an object to the position immediately behind the door, i.e. aligned with the door opening.

In the latter embodiment or in an alternative preferred embodiment the monument further comprises a foldable table mounted immediately below the door opening and foldable between a storage position, in which it is oriented parallel to a front surface of the galley, and an operating position, in which it projects perpendicularly from the front surface. Such a table facilitates transfer of an object from the monument to, e.g., a transport device arranged in the passenger compartment for further transport of the object. In the case of a galley, the transport device may be a trolley used for transporting catering goods lifted from the cargo compartment into the galley to the passengers.

In a preferred embodiment the monument further comprises a control panel adapted for operating the control means, e.g. by allowing an operator to enter control commands.

As can already be derived from to above, the invention also provides for an aircraft comprising a first compartment, a second compartment arranged below the first compartment, a floor structure separating the first and second compartments from each other and having an aperture, and a monument according to any of the embodiments described herein. In particular, the first compartment may be a passenger compartment and the second compartment may be a cargo compartment. The monument, such as, in particular, a galley, is mounted to the floor structure in such a manner that the longitudinal axis of the cavity is oriented perpendicularly to the floor structure and the open end of the cavity is aligned with the aperture of the floor structure. Due to this arrangement the lift apparatus is operable for vertically lifting objects from the second compartment through the aperture of the floor structure and the open end of the cavity into the cavity, i.e. into the monument.

In a preferred embodiment the aircraft comprises in the second compartment an arrangement adapted for locating or securing a cargo container having predetermined dimensions, being disposed in the second compartment and comprising an aperture in such a manner that the aperture of the cargo container is facing and aligned with the aperture of the floor structure. Thus, the lift apparatus is operable to vertically lift objects from inside the container through the aperture of the container, the aperture of the floor structure and the open end of the cavity into the cavity. This is particularly advantageous for the above example of catering goods being stored in a storage rack arrangement inside the cargo container. The cargo container then preferably comprises an integrated automatic transport means for selectively transporting catering goods from the storage rack arrangement to a predetermined position inside the cargo container. This position is chosen such that the gripping unit of the lift apparatus is operable to grip objects disposed there.

Instead of a cargo container the aircraft may also comprise a cargo unit or arrangement fixedly installed in the second compartment. Such a cargo unit or arrangement may or may not comprise a housing having an aperture similar to the aperture of the cargo container. It may be an open unit or arrangement. Apart from that the same applies as for the embodiment using a cargo container.

BRIEF DESCRIPTION OF THE DRAWINGS

In the following an exemplary embodiment of the invention will be described in more detail with reference to the figures.

DETAILED DESCRIPTION

Figure 1:
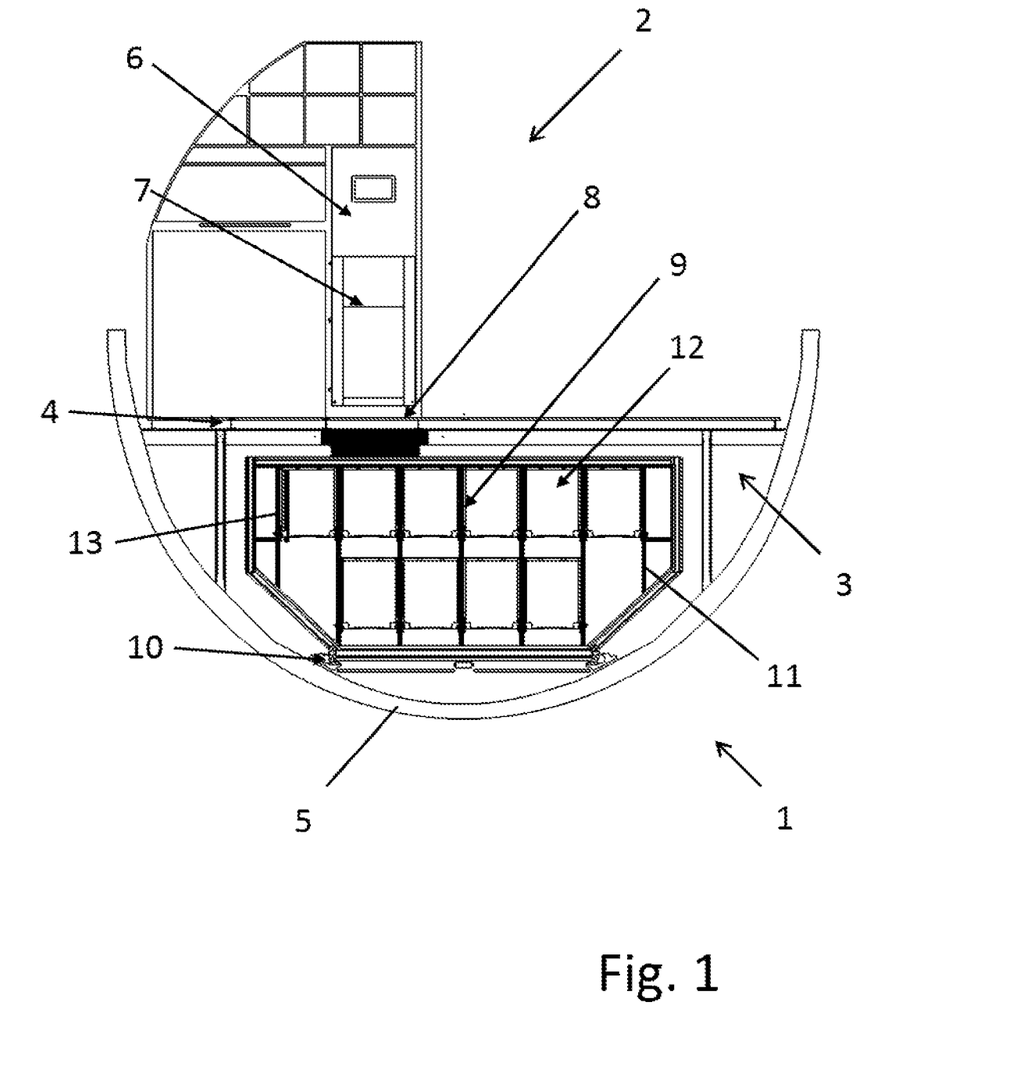
FIG. 1 shows a cross-sectional view of an aircraft comprising a monument according to the present invention in the form of an aircraft galley.

The aircraft 1 shown in FIG. 1 in cross-section perpendicular to the longitudinal direction of the aircraft comprises a passenger compartment 2 and a cargo compartment 3 separated by a floor structure 4. The outer skin 5 of the aircraft 1 is shown only partly in FIG. 1.

Inside the passenger compartment 2 a galley 6 is mounted on the floor structure 4. The galley 6 comprises, amongst others, a lift compartment 7 which is arranged immediately above and aligned with an aperture 8 selectively closeable by a hatch unit not shown in detail in FIG. 1. Inside the cargo compartment 3 a cargo container 9 is disposed and secured in the position shown in FIG. 1 by means of a conventional cargo hold arrangement 10 with suitable latches. In the illustrated example the cargo container 9 has an outer shape and outer dimension identical to a conventional LD3 cargo container. However, it is also possible for the cargo container 9 to have other standard shapes and dimensions.

In any case, the cargo container 9 comprises in its upper wall an aperture (not shown in detail in FIG. 1) located immediately below and in alignment with the aperture 8 in the floor structure 4. In the cargo container 9 a storage rack arrangement 11 is disposed storing a plurality of service boxes 12, each including catering goods such as food and beverages. Further, a transport device 13 is provided inside the cargo container 9 operable for selectively transporting service boxes 12 between the storage rack arrangement 11 and a predetermined position immediately below and adjacent to the aperture in the upper wall of the cargo container 9 (in FIG. 1 the transport device 13 is essentially covered by the storage rack arrangement 11 disposed along the sidewall of the cargo container 9 extending parallel to the plane of the drawing and facing towards the viewer). Thus, in case a particular service box 12 (more particularly the contents thereof) is needed by the crew in the passenger compartment 2, the transport device 13 may be operated to automatically transport the respective service box 12 to the predetermined position.

Figure 2:
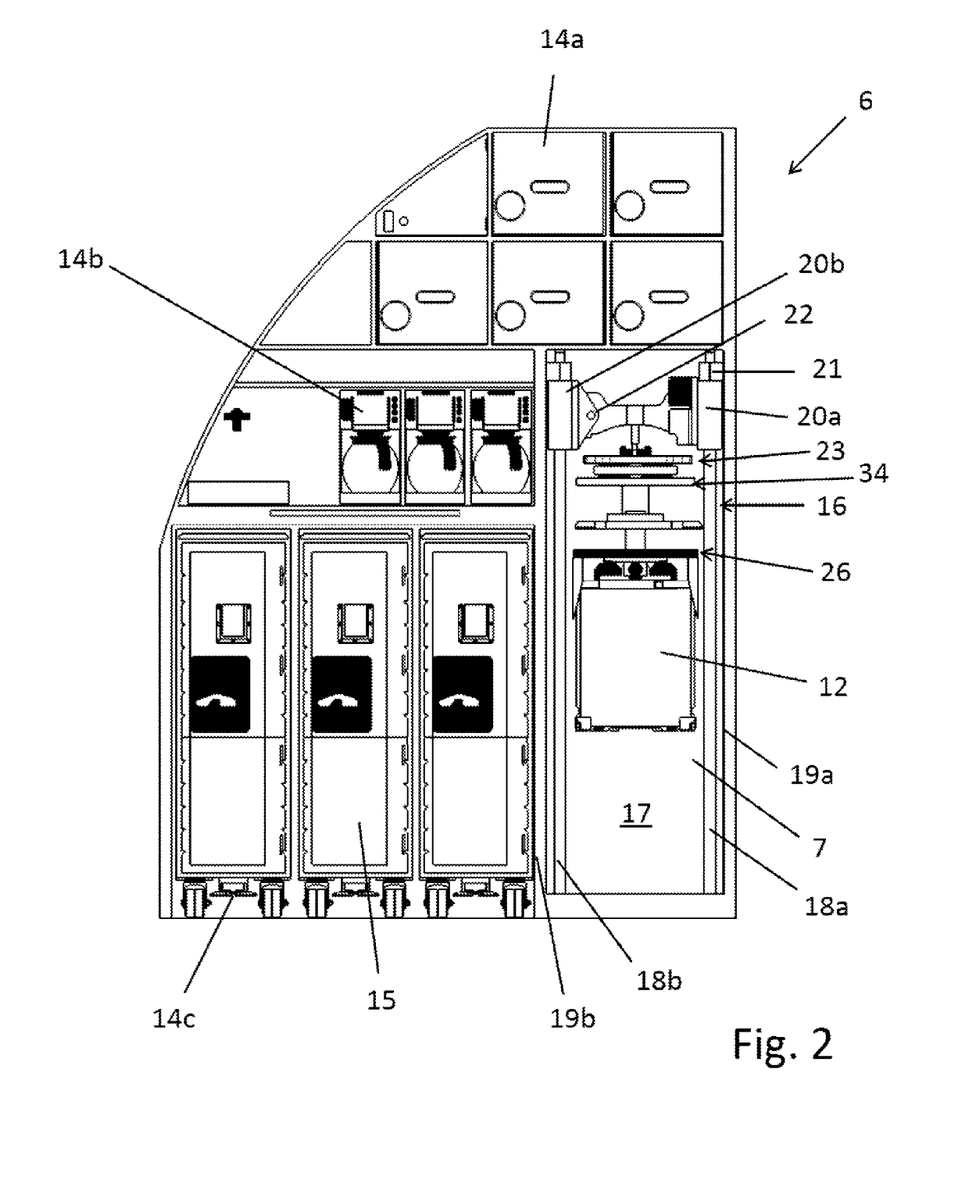
FIG. 2 shows a front view of the aircraft galley of FIG. 1.

As illustrated in FIG. 2, which shows the galley 6 in more detail with doors and coverings normally covering various galley compartments removed, the galley 6 comprises in a conventional manner a plurality of storage compartments 14a, a plurality of processing compartments 14b, in which, e.g., coffee machines are disposed, and a plurality of trolley compartments 14c, each accommodating a corresponding trolley 15. In addition, the galley 6 comprises the lift compartment 7, and as can be seen in FIG. 2 a lift apparatus 16 is mounted inside the lift compartment 7, and the lift apparatus 16 is operable for vertically lifting a service box 12 disposed by the transport device 13 at the predetermined position inside the cargo container 9 through the aperture in the upper wall of the cargo container 9 and the aperture 8 in the floor structure 4 into the interior cavity 17 of the lift compartment 7 (as illustrated in FIG. 2). The cavity 17 is elongate with its longitudinal axis oriented perpendicularly with respect to the plane of the floor structure 4, and has a rectangular or square cross-section in a plane perpendicular to the longitudinal axis along the entire length of the cavity 17. Thus, the cavity 17 has a cuboid shape.

The lift apparatus 16 comprises two straight bar-shaped guide rails 18a, 18b mounted to two opposing sidewalls 19a, 19b of the lift compartment 7 such that they are oriented parallel to the longitudinal axis of the cavity 17. Consequently, the guide rails 18a, 18b are disposed opposite each other, i.e. at an angular distance of 180° with respect to the longitudinal axis of the cavity 17.

The lift apparatus 16 further comprises two generally cuboid conveying members 20a, 20b, each mounted to a different one of the guide rails 18a, 18b in such a manner that they are linearly movable along the guide rails 18a, 18b in a guided manner, i.e. in a direction parallel to the longitudinal axis of the cavity 17 and perpendicular to the plane defined by the floor structure 4. For the sake of ease of understanding the guide rails 18a, 18b and the conveying members 20a, 20b are shown in isolation in FIG. 3. It is evident that the conveying members 20a, 20b constitute carriages which are secured and guided by the guide rails 18a, 18b and are able to move along the guide rails 18a, 18b. They are arranged on two opposite sides of the aperture 8 in the floor structure 4. Their range of linear movement is limited by upper and lower mechanical stops 21, which are at the same time elements by means of which the guide rails 18a, 18b are secured to the sidewalls 19a, 19b such that the guide rails 18a, 18b are spaced from the respective associated sidewall 19a, 19b. Thus, the elements 21 are fixedly secured to the sidewalls 19a, 19b, and each of the guide rails 18a, 18b is mounted between a pair of upper and lower elements 21. Further, each such pair of elements 21 may serve as a bearing for a respective spindle 32, wherein the spindles 32 form part of the guide rails 19a, 19b or longitudinally extend through them.

Figure 3:
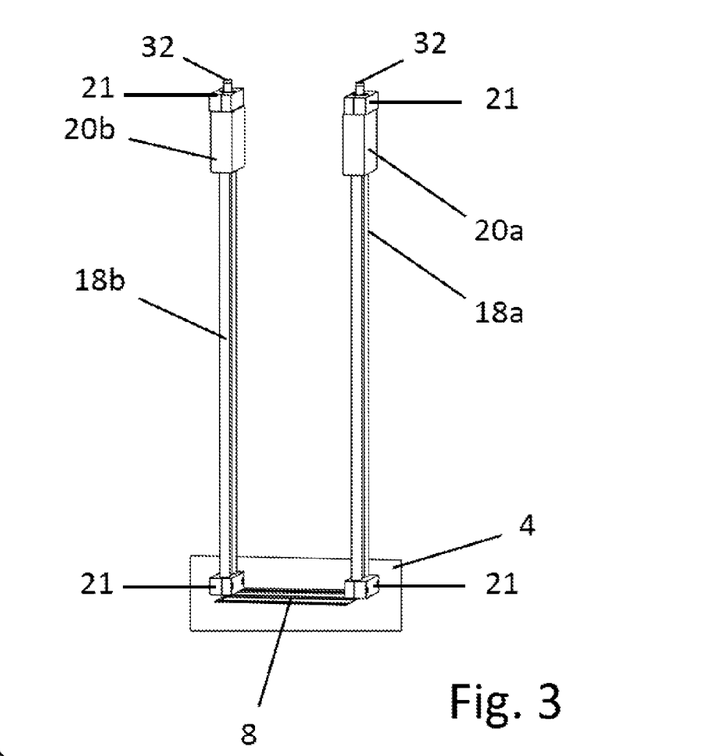
FIG. 3 shows a view of elements of the lift apparatus of the aircraft galley.

For effecting the linear movement of the conveying members 20a, 20b two electrical motors (not shown) are provided which move the conveying members 20a, 20b and are synchronized by a suitable control means for the two conveying members 20a, 20b to always be at the same height above the floor structure 4 and to always move at the same speed. While the motors may be adapted and arranged to move the conveying members 20a, 20b via means such as belts (not shown), it is preferred if the motors are adapted and arranged to rotate spindles 32 as described above and as shown in the Figures. Then, each of the conveying members 20a, 20b are in engagement with an associated one of the spindles 32 such that by rotating the spindles 32 the conveying members 20a, 20b are moved up and down along the guide rails 18a, 18b.

Figure 4:
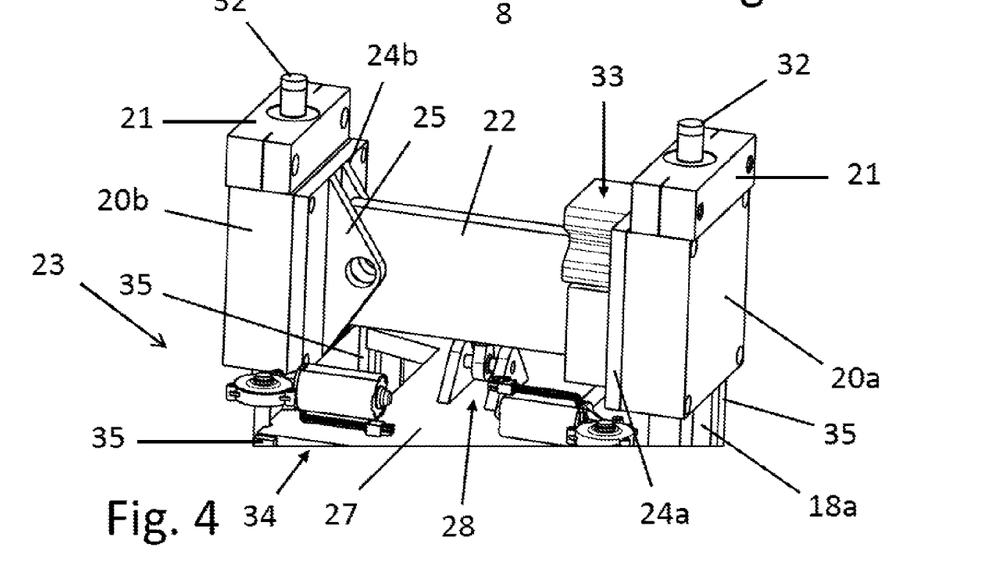
FIG. 4 shows a view of other elements of the lift apparatus of the aircraft galley.

As shown in FIGS. 2 and 4, a suspension device 22 forming part of a gripping device 23 for gripping and holding the respective service box 12 to be lifted is mounted between the two conveying members 20a, 20b. The suspension device 22 is a bar-shaped component which is coupled at two opposite ends to the conveying members 20a, 20b. The coupling is provided via corresponding coupling plates 24a, 24b which are fixedly mounted to the conveying members 20a, 20b. The coupling plate 24b comprises a projection 25 on the surface facing away from the respective conveying member 20b, and the suspension device 22 is coupled to the projection 25 such that it is rotatable about an axis perpendicular to the direction between the two conveying members 20a, 20b and the longitudinal axis of the cavity 17. The coupling plate 24a comprises on the surface facing away from the respective conveying member 20a a spherical or ball bearing arrangement or loose bearing arrangement 33 which engages the end portion of the suspension device 22 opposite the end portion coupled to the projection 25 in such a manner that a relative rotational movement between the suspension device and the coupling plate 24a about three perpendicular axes is possible. In this manner a jamming of the lift apparatus 16 in this region is avoided.

To the lower edge of the suspension device 22 a gripper 26 is mounted in a suspended manner via a coupling arrangement 34 in the middle between the two ends of the suspension device 22 coupled to the conveying members 20a, 20b. The coupling arrangement 34 comprises an upper plate 27 which is coupled to the suspension device 22 via a ball bearing arrangement 28 allowing for rotation of the upper plate 27 relative to the suspension device 22 about three perpendicular axes, further aiding in avoiding jamming. The remainder of the coupling arrangement 34 is coupled to the upper plate 27 such that at least the gripper 26 is rotatable about an axis extending perpendicularly to the upper plate 27. Preferably, such rotation is limited by suitable stops, e.g. to about 10°. This rotation allows for rotational alignment of the gripper 26.

Due to the above construction, by moving the conveying members 20a, 20b the gripper 26 can be linearly moved inside the cavity 17 and through the aperture 8 into the cargo compartment 3, can grip a service box 12 located in the predetermined position inside the cargo container 9, and can be linearly moved into the opposite direction to vertically lift the service box 12 into the cavity 17 of the galley 6 into the position shown in FIG. 2.

In this regard, the upper plate 27 and preferably also other portions of the coupling arrangement 34 and the gripper 26 itself are guided by a plurality of guide tracks 35 fixed to the sidewalls of the cavity 17 and extending parallel to the guide rails 18a, 18b and to one another, at least along most of their length. Such guide tracks 35 may extend away from each other and from the longitudinal axis of the cavity 17 in an end region of the arrangement of the guide tracks 35 near the aperture 8, so that the gripper 26 is released from the guidance by the guide tracks 35 when positioned in that region. In this manner, the gripper 26 is able to rotate about the longitudinal axis to suitably align itself with an object to be gripped, whereas the remainder of the gripping device 23 is still guided.

Figure 5:
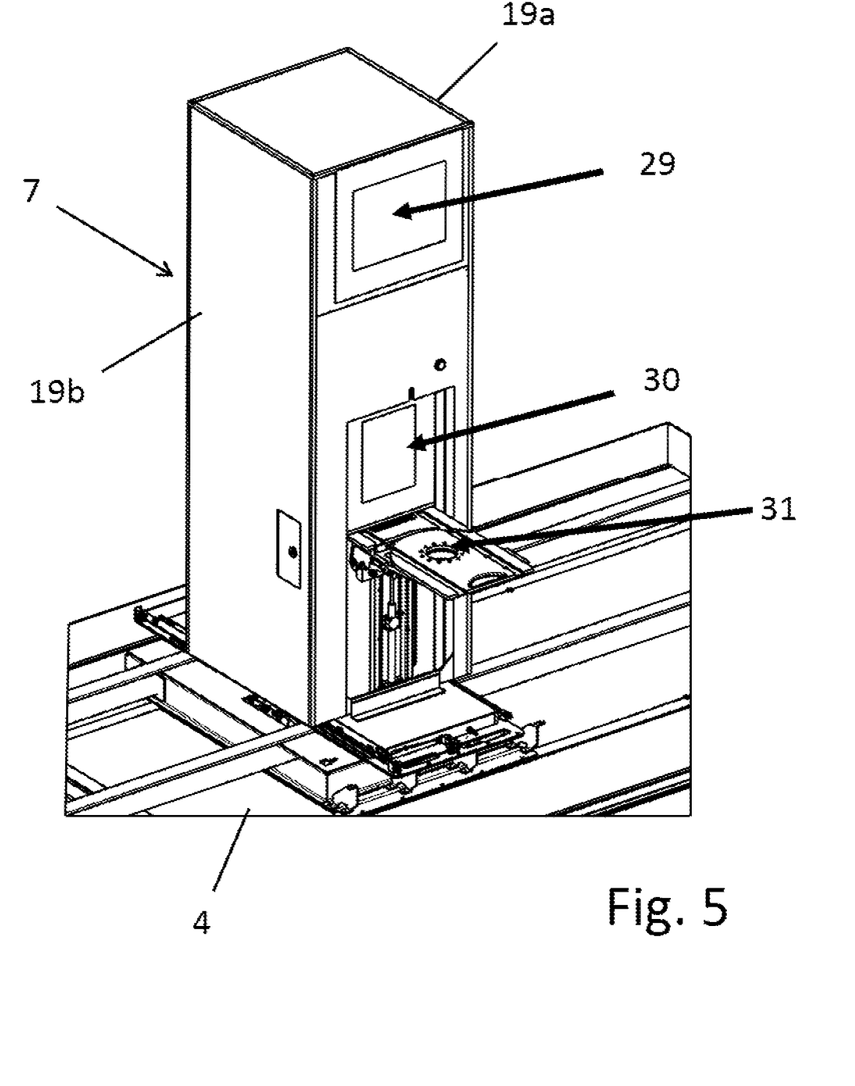
FIG. 5 shows a portion of the aircraft galley in which the lift apparatus is disposed.

FIG. 5 schematically illustrates the lift compartment 7 in an isolated manner. In this regard, it is to be understood that the lift compartment 7 may be entirely integrated into the galley 6 in such a manner that in reality such a separation of the lift compartment 7 and the remainder of the galley 6 is not possible or not easily possible. As can be taken from FIG. 5, the lift compartment 7 comprises on its front surface visible when standing in front of the galley 6 a control unit 29 having a control panel, a sliding door 30 selectively opening and closing an access opening in the front surface of the lift compartment 7, and a handling table 31 shown to perpendicularly project from the front surface of the lift compartment 7 in FIG. 5. The control unit 29 is adapted and operable for controlling the entire operation of the lift apparatus 16, in particular the synchronous movement of the conveying members 20a, 20b and the gripping and releasing operation of the gripper 26. The sliding door 30 prevents access to the cavity 17 if no service box 12 is located in the cavity 17 and, controlled by the control unit 29, preferably opens and grants access only if a service box 12 is located immediately behind the sliding door 30. The handling table 31 is pivotally mounted to the front surface of the lift compartment 7 in such a manner that it can be folded downwardly from the position of FIG. 5 to be oriented parallel to and in abutment with the front surface of the lift compartment 7. In the position of FIG. 5 it can be used to support a service box 12 vertically lifted and released by the gripper 26 and removed from the cavity 17 prior to be unpacked or, e.g., loaded into a trolley 15 for transport to the passengers.

The invention claimed is:

1. A monument for an aircraft, the monument comprising:
a straight elongate cavity open at one of longitudinal ends thereof towards the exterior of the monument; and
a lift apparatus mounted to the monument and adapted for lifting goods from outside the monument along the longitudinal axis of the cavity through the open end into the cavity,
wherein the monument is adapted to be mounted on a floor structure of an aircraft separating two compartments of the aircraft from each other such that the longitudinal axis is oriented perpendicularly to the floor structure and the open end of the cavity is facing the floor structure, the lift apparatus comprising:
a guide means extending parallel to the longitudinal axis of the cavity;
a conveying means disposed in the cavity and mounted to the guide means such that the conveying means is linearly moveable along the guide means;
a moving means adapted for driving the conveying means to linearly move along the guide means;
a control means adapted for controlling the moving means; and
a gripping means disposed in the cavity, secured to the conveying means and adapted for selectively gripping and releasing goods,
wherein the guide means comprises first and second straight guide members spaced from each other, each being attached to or integrated into a different one of two spaced opposing wall portions of a sidewall arrangement defining the cavity and extending parallel to the longitudinal axis of the cavity,
wherein the conveying means comprises first and second conveying members, each mounted to a different one of the guide members such that the first and second conveying members are linearly moveable along the respective guide members,
wherein the moving means is adapted for driving the first and second conveying members to linearly move along the guide members,
wherein the control means is adapted for controlling the moving means to synchronize the linear movement of the first and second conveying members effected by the moving means, and
wherein the gripping means is secured to the first and second conveying members such that the first and second guide members are disposed on opposite sides of the gripping means.

2. The monument according to claim 1, wherein the monument is an aircraft galley.

3. The monument according to claim 1, wherein the lift apparatus further comprises a suspension means attached to and supported between the first and second conveying members, and
wherein the gripping means is secured to the suspension means in a suspended manner.

4. The monument according to claim 3, wherein the suspension means is mounted to each of the first and second conveying members by a respective bearing arrangement allowing for relative rotational movement about at least one axis.

5. The monument according to claim 3, wherein the gripping means is mounted to the suspension means by an articulated joint.

6. The monument according to claim 1, wherein the moving means comprises first and second electrical synchronized motors or first and second hydraulic synchronized moving means.

7. The monument according to claim 1, wherein the moving means comprises a single electrical motor and a power splitting means for splitting the power provided by the single electrical motor and synchronously distributing the power to the conveying members.

8. The monument according to claim 2, wherein the lift apparatus further comprises a suspension means attached to and supported between the first and second conveying members,
 wherein the gripping means is secured to the suspension means in a suspended manner,
 wherein the monument comprises a plurality of trolley compartments and a plurality of trolleys, each removably received in a respective one of the trolley compartments, and
 wherein the width of the cavity is at most 1.5 times the width of the trolley compartments.

9. The monument according to claim 1, wherein the moving means comprises belts or chains attached to the conveying members and operable for moving the conveying members along the guide members, or spindles engaging the conveying members and operable for moving the conveying members along the guide members by rotation of the spindles.

10. The monument according to claim 1, further comprising a door and a door opening provided in the sidewall arrangement through which the cavity is accessible,
 wherein the door is adapted for selectively opening and closing the door opening.

11. The monument according to claim 10, further comprising a foldable table mounted immediately below the door opening and foldable between a storage position, in which the foldable table is oriented parallel to a front surface of the galley, and an operating position, in which the foldable table projects perpendicularly from the front surface.

12. The monument according to claim 1, further comprising a control panel adapted for operating the control means.

13. An aircraft comprising:
 a first compartment,
 a second compartment arranged below the first compartment,
 a floor structure separating the first and second compartments from each other and having an aperture, and
 a monument disposed in the first compartment, the monument comprising:
 a straight elongate cavity open at one of longitudinal ends thereof towards the exterior of the monument; and
 a lift apparatus mounted to the monument and adapted for lifting goods from outside the monument along the longitudinal axis of the cavity through the open end into the cavity,
 wherein the monument is adapted to be mounted on a floor structure of an aircraft separating two compartments of the aircraft from each other such that the longitudinal axis is oriented perpendicularly to the floor structure and the open end of the cavity is facing the floor structure, the lift apparatus comprising:
 a guide means extending parallel to the longitudinal axis of the cavity;
 a conveying means disposed in the cavity and mounted to the guide means such that the conveying means is linearly moveable along the guide means;
 a moving means adapted for driving the conveying means to linearly move along the guide means;
 a control means adapted for controlling the moving means; and
 a gripping means disposed in the cavity, secured to the conveying means and adapted for selectively gripping and releasing goods,
 wherein the guide means comprises first and second straight guide members spaced from each other, each being attached to or integrated into a different one of two spaced opposing wall portions of a sidewall arrangement defining the cavity and extending parallel to the longitudinal axis of the cavity,
 wherein the conveying means comprises first and second conveying members, each mounted to a different one of the guide members such that the first and second conveying members are linearly moveable along the respective guide members,
 wherein the moving means is adapted for driving the first and second conveying members to linearly move along the guide members,
 wherein the control means is adapted for controlling the moving means to synchronize the linear movement of the first and second conveying members effected by the moving means,
 wherein the gripping means is secured to the first and second conveying members such that the first and second guide members are disposed on opposite sides of the gripping means,
 wherein the longitudinal axis of the cavity is oriented perpendicularly to the floor structure and the open end of the cavity is aligned with the aperture of the floor structure, such that the lift apparatus is operable for vertically lifting goods from the second compartment through the aperture of the floor structure and the open end of the cavity into the cavity.

14. The aircraft according to claim 13, further comprising a cargo container disposed in the second compartment and comprising an aperture facing and aligned with the aperture of the floor structure, such that the lift apparatus is operable to vertically lift goods from inside the container through the aperture of the container, the aperture of the floor structure and the open end of the cavity into the cavity.

15. The aircraft according to claim 13, further comprising a cargo arrangement fixedly installed in the second compartment and aligned with the aperture of the floor structure, such that the lift apparatus is operable to vertically lift goods from the cargo arrangement through the aperture of the floor structure and the open end of the cavity into the cavity.

\* \* \* \* \*